United States Patent
Suzuki

(10) Patent No.: US 6,237,133 B1
(45) Date of Patent: *May 22, 2001

(54) MASK PATTERN DATA CREATION METHOD AND SYSTEM THAT ARE NOT SUBJECT TO DATA STREAM DATA FORMAT LIMITATIONS

(75) Inventor: Kyou Suzuki, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,084

(22) Filed: Mar. 13, 1998

(30) Foreign Application Priority Data

Mar. 14, 1997 (JP) ...................................................... 9-082052

(51) Int. Cl.[7] ...................................................... G06F 17/10
(52) U.S. Cl. .................................. 716/19; 716/20; 716/21
(58) Field of Search ........................... 395/500.2, 500.21, 395/500.22, 500.12; 716/19, 20, 21, 11, 12

(56) References Cited

U.S. PATENT DOCUMENTS

| | | | |
|---|---|---|---|
| 5,046,012 | * | 9/1991 | Morishita et al. ................. 700/121 |
| 5,633,807 | * | 5/1997 | Fishburn et al. .................... 716/19 |
| 5,764,530 | * | 6/1998 | Yokomaku ............................ 716/12 |

FOREIGN PATENT DOCUMENTS

| | | |
|---|---|---|
| 61-45364 | 3/1986 | (JP). |
| 4-330568 | 11/1992 | (JP). |
| 5-267454 | 10/1993 | (JP). |
| 6-20003 | 1/1994 | (JP). |
| 7-146945 | 6/1995 | (JP). |

* cited by examiner

Primary Examiner—Matthew Smith
Assistant Examiner—Vuthe Siek
(74) Attorney, Agent, or Firm—Sughrue, Mion, Zinn, Macpeak & Seas, PLLC

(57) ABSTRACT

A mask pattern data creation method which automatically reflects changes made to layout cell data upon correcting the layout cell data hierarchically lower than mask pattern data, and eliminates the need for a user to manually perform deletion processing or layout processing in order to prevent human errors that may be introduced into layout data on the layout cell data to be laid out in the mask pattern data. The method places the layout cell data hierarchically below dummy cell data based on the layout data of entered layout cell data and then places the dummy cell data hierarchically below the mask pattern data, adds the layout data on the layout cell data to the dummy cell data, and creates graphic data corresponding to an angle specified in the layout data by expanding the layout cell data below the dummy cell data. When correcting the layout cell data, the system reads the layout data added to the dummy cell data and deletes the graphic data from the dummy cell data.

7 Claims, 13 Drawing Sheets

1001; MASK PATTERN DATA
1201; GRAPHIC DATA
1301; ANGLE $\theta$

MASK PATTERN DATA CREATION METHOD AND SYSTEM THAT ARE NOT SUBJECT TO DATA STREAM DATA FORMAT LIMITATIONS

FIELD OF THE INVENTION

The present invention relates to a semiconductor integrated circuit mask pattern data creation method, and more particularly to a mask pattern creation method and system that are not subject to data stream data format limitations.

BACKGROUND OF THE INVENTION

A conventional mask pattern creation method is described with reference to FIG. 8. In the conventional system, mask pattern data created by a mask pattern data creation system 801 is converted to a stream data format, such as GDS (ECMA-96), and is output on a recording medium such as a magnetic tape as stream data 605. Created mask pattern data is used in subsequent steps.

The mask pattern data creation system 801 has a display unit 606 such as a CRT display and a keyboard 607 for I/O processing (user interface).

FIGS. 10 and 11 schematically show the hierarchical structure of mask pattern data. An earlier patent disclosure dealing with the block layout of a hierarchical data structure having a block, sub-blocks of the block, and basic cells which are the lowest-level blocks, etc. is found, for example, in Japanese Patent Kokai Publication JP-A-61-45364.

If there is a limit that the layout angle of layout cell data 1002 which is placed in a lower hierarchical level in the stream data format must be in 90-degree units when creating hierarchically-structured mask pattern data 1001 as shown in FIGS. 10 and 11, a limit that a mask pattern data creation function 802 of the mask pattern creation system 801 must always create layout cell data 1002 in 90-degree units is imposed in order to avoid conflict with the limitation in the stream data format.

However, this method cannot be used to create layout cell data with an arbitrary layout angle other than 90 degrees such as 15 degrees, 30 degrees, and so forth.

On the other hand, Japanese Patent Kokai Publication JP-A-7-146945 discloses a data processing system which expands a continuous pattern in any rotational angle on a word processor or a DTP (Desk Top Publishing) system. FIG. 9 shows the configuration of a system in which the function disclosed by Japanese Patent Kokai Publication JP-A-7-146945 is implemented in the conventional mask pattern data creation function 802 shown in FIG. 8. Although the data processing system disclosed by the above patent publication is not a mask pattern creation system, the following describes a system in which the above-described data processing system with the function of expanding a continuous pattern of any rotational angle is applied to mask pattern data creation. The configuration of this system was invented also by the inventor of the present invention.

As shown in FIG. 9, the mask pattern data creation function 802 has super cell creation means 903 and expansion means (flattering means) 904. The super cell creation means has a rotational angle storage module 902 which stores into memory angle data θ (see 1301 in FIG. 13) entered from a keyboard 607 (see FIG. 8) via a control module 901, and the super cell creation means 903 creates super cells having an arbitrary angle of θ stored into memory from layout cell data (1002 in FIGS. 10 and 11). The expansion means (flattening means) 904 expands super cells into graphic data having no hierarchical structure (1201 in FIGS. 12 and 13) onto mask pattern data. This function may create layout cell data with an arbitrary pseudo-angle of θ in a hierarchical level lower than that of mask pattern data (1001 in FIGS. 12 and 13). Actually, the layout cell data, which is expanded graphic data 1202 (see FIGS. 12 and 13), is in mask pattern data 1001.

SUMMARY OF THE DISCLOSURE

Following problems have been encountered in the course of investigation toward the present invention. Namely, for mask pattern data with a hierarchical structure (see 1001 in FIGS. 10 and 11) described above, changes made to lower-level layout cell data (see 1002 in FIGS. 10 and 11) are reflected on the layout cell data. On the other hand, changes made to layout cell data with a pseudo angle of θ (1201 in FIGS. 12 and 13), which is actually expanded graphic data, are not reflected on the layout cell data.

That is, layout cell data which is hierarchically lower than mask pattern data is rotated through an arbitrary angle of θ after having been expanded into graphic data (i.e., graphic data 1201 resulting from hierarchical flattering of layout cell data). In this case, layout cell data is converted into graphic data having no hierarchical structure as shown in FIG. 12 and so it is impossible to trace layout cell data from this mask pattern data 1001. Therefore, when a need arises to correct the original layout cell data, it must be corrected and then laid out, expanded, or rotated again.

More specifically, after manually deleting layout cell data (graphic data) with a pseudo rotation angle of θ and laying out corrected layout cell data, it is necessary to create super cell data with an angle of θ from the layout cell data again and to expand the super cell data into graphic data having no hierarchical structure onto the mask pattern data.

At this time, there is a possibility that the user specifies incorrect layout coordinates, rotational angle θ, and layout cell data location (storage location or address).

The present invention seeks to solve the problems associated with the prior art described above. It is an object of the present invention to provide a creation method of mask pattern data having a hierarchical structure, which automatically reflects changes done to layout cell data when correcting the layout cell data hierarchically lower than mask pattern data, and eliminates the need for a user to manually perform deletion processing or layout processing in order to prevent human errors that may be introduced into layout data on the layout cell data to be laid out in mask pattern data.

It is a further object of the present invention to provide a system or program for carrying out the method.

Still further objects of the present invention will become apparent in the entire disclosure.

To achieve the above object, there is provided a mask pattern data creation method according to a first aspect of the present invention. The method comprises the steps of placing layout cell data hierarchically below dummy cell data based on entered layout data of the layout cell data, placing the dummy cell data hierarchically below mask pattern data, and on the other hand adding the layout data of the layout cell data to the dummy cell data as additional data; and creating graphic data rotated through an angle specified in the layout data by expanding the layout cell data placed hierarchically below the dummy cell data.

According a second aspect, there is provided a mask pattern data creation system. The system comprises layout data input means which reads layout data of layout cell data; dummy cell layout means which places the layout cell data hierarchically below dummy cell based on said layout data and places said dummy cell data hierarchically below mask pattern data, and which adds the layout data of said layout cell data to said dummy cell data as additional data. The system further comprises layout expansion means which creates graphic data corresponding to an angle specified in the layout data by expanding the layout cell data placed hierarchically below said dummy cell data.

The mask pattern data creation system may further comprises layout data acquisition means which reads the layout data from said dummy cell data when the layout cell data is corrected; and deletion means which deletes the graphic data from said dummy cell data.

The mask pattern data creation system may preferably comprises layout data acquisition means which gets the layout data of the layout cell data not satisfying a format limitation upon outputting the mask pattern data.

According to a third aspect of the present invention, there is provided a computer-readable medium having stored therein a mask pattern creation program which creates mask pattern data using a data processing system. The program may comprise the following processes:

(a) a layout data input process which reads layout data of layout cell data;

(b) a dummy cell layout process which places the layout cell data hierarchically below dummy cell based on said layout data and places said dummy cell data hierarchically below mask pattern data and which adds the layout data on said layout cell data to said dummy cell data as additional data; and (c) a layout expansion process which creates graphic data corresponding to an angle θ specified in the layout data by expanding the layout cell data placed hierarchically below said dummy cell data.

The program preferably further comprises:

(d) a layout data acquisition process which reads the layout data added to said dummy cell data when the layout cell data is corrected; and (e) a deletion process which deletes the graphic data from said dummy cell data.

The program may further comprise:

(f) a layout data acquisition process which acquires the layout data of the layout cell data not satisfying a format limitation upon outputting the mask pattern data.

DETAILED DESCRIPTION OF THE PREFERRED EMBODIMENTS

Figure 1:
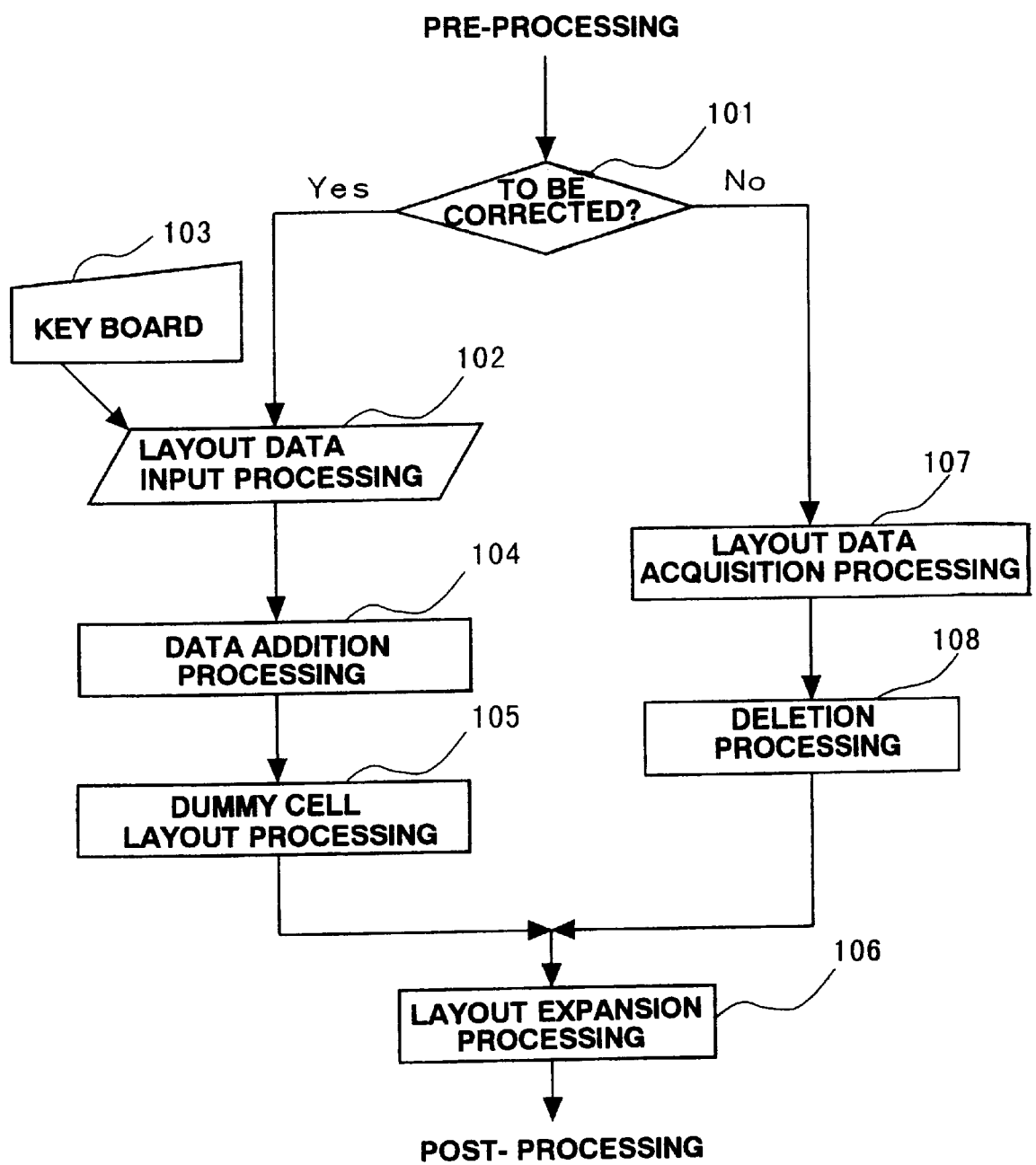
FIG. 1 is a diagram showing the processing flow of a mask pattern data creation function used in an embodiment of the present invention.

An embodiment according to the present invention is described below. In a preferred form, the embodiment according to the present invention comprises layout data input means (102 in FIG. 1) which reads layout data on layout cell data, dummy cell layout means (105 in FIG. 1) which places the layout cell data hierarchically below dummy cell data (virtual or temporary cell data is called "dummy cell") based on the layout data and then places the dummy cell data hierarchically below mask pattern data, data addition means (104 in FIG. 1) which adds the layout data on the layout cell data as additional data, and layout expansion means (106 in FIG. 1) which creates graphic data based on the layout data by expanding the layout cell data below the dummy cell data; when correcting the layout cell data, the embodiment further comprises layout data acquisition means (107 in FIG. 1) which reads the layout data added to the dummy cell data and deletion means (108 in FIG. 1) which deletes the graphic data from the dummy cell data.

The embodiment according to the present invention which has the configuration described above configures the hierarchically-structured mask pattern data so that, when changes are done to the layout cell data which is placed in a lower hierarchical level, the changes are reflected on the mask pattern data. The embodiment eliminates the need for manual deletion processing and layout processing, preventing a human error from occurring in the layout data on the layout cell data which is hierarchically below the mask pattern data.

In the embodiment of the present invention, the functions of the above-described means are implemented by executing programs on a data processing system.

Figure 2:
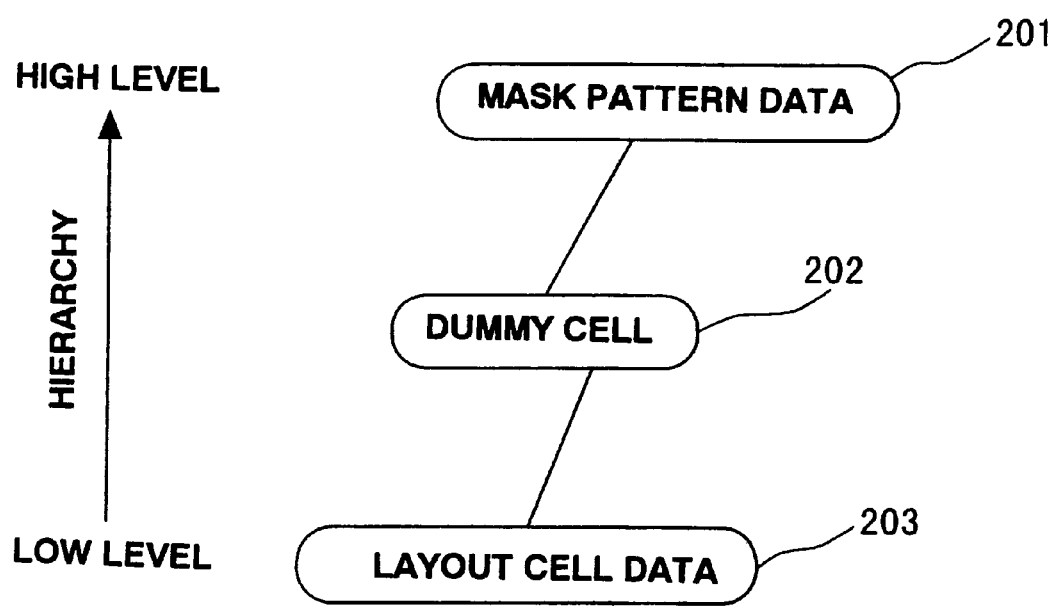
FIG. 2 is a diagram showing an embodiment of the present invention and explains a mask pattern data hierarchical structure.
Figure 3:
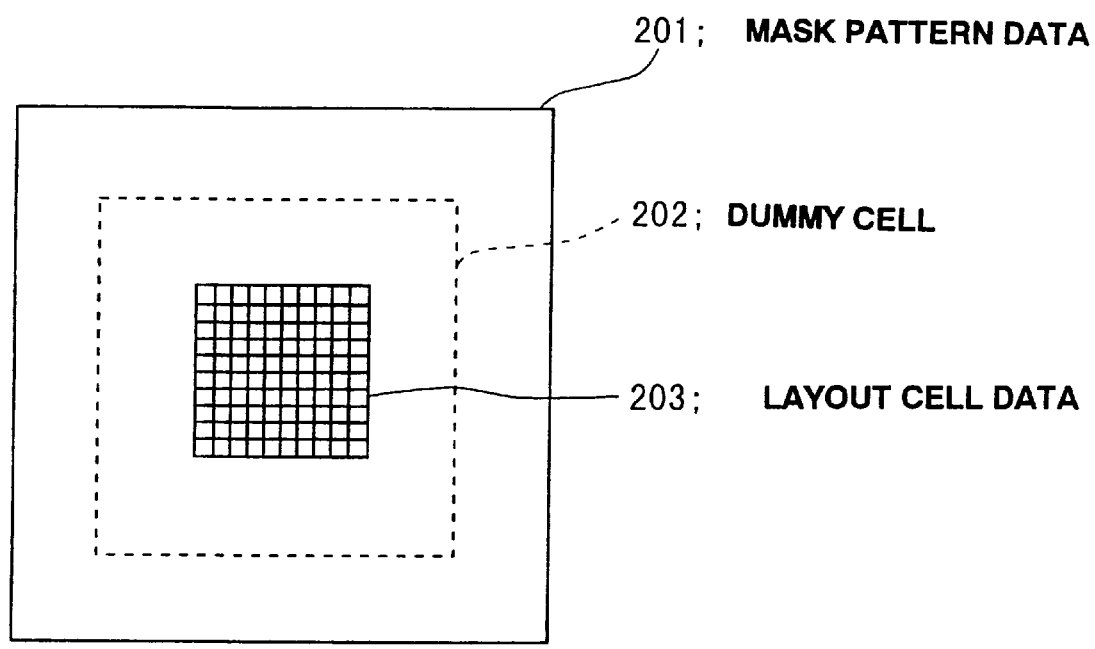
FIG. 3 is a diagram showing an embodiment of the present invention and explains mask pattern data.

The embodiment of the present invention is detailed with reference to the attached drawings. FIG. 1 is a diagram schematically showing the processing flow of a part of the mask pattern creation function of the embodiment. FIG. 2 is a diagram schematically showing the hierarchical structure of the mask pattern data before layout expansion processing 106. FIG. 3 is a diagram showing the mask pattern data. Table 1 given below shows an example of layout data stored in memory and added to the dummy cell data.

As shown in FIG. 1, when new layout cell data with an angle of θ is created ("yes" as a result of correction judgment processing 101), the name (CellName in Table 1) of layout cell data 203 (see FIG. 2), a directory path (DirPath in Table 1) indicating the location (location in storage) of the data, the layout coordinates (coordinates in Table 1, such as X-Y coordinates) of the layout cell data 203, and an angle θ (Angle in Table 1) are first read from, e.g., a keyboard 103 during layout data input processing 102 and are stored in memory as layout data.

Next, data addition processing 104 is executed to add the layout data (see Table 1) stored in memory as additional data of dummy cell data 202.

Next, dummy cell data layout processing 105 is executed to place the layout cell data 203 hierarchically below the dummy cell data 202.

TABLE 1

| Additional-data name | Value |
| --- | --- |
| CellName (Cell name) | XXXX |
| DirPath (Directory path) | / dir1 / dir2 / dir3 |
| Coordinate (Coordinates) | X1, Y1, X2, Y2 |
| Angle (Angle) | θ |

Figure 4:
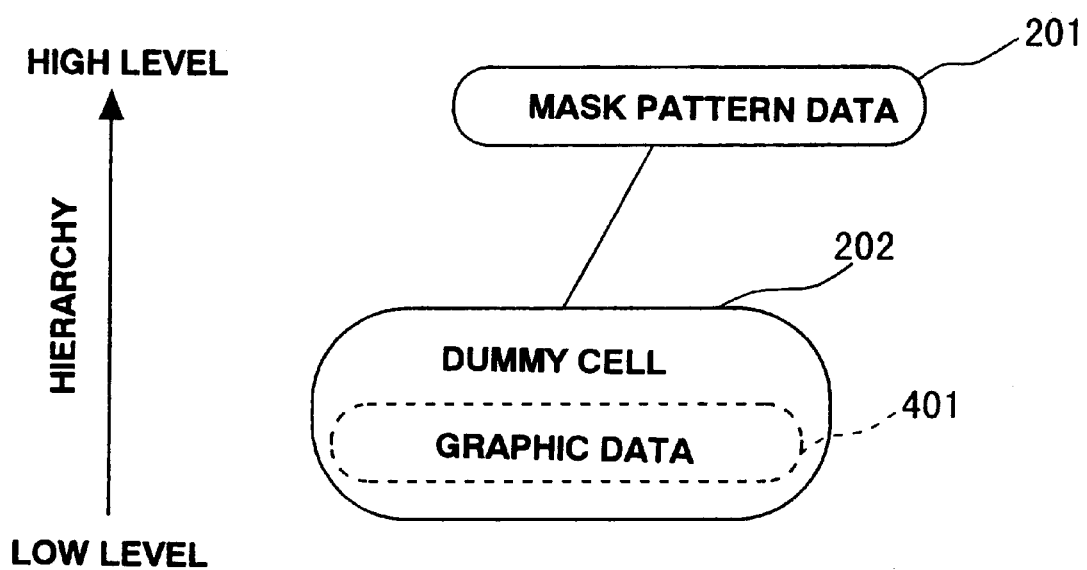
FIG. 4 is a diagram showing an embodiment of the present invention and explains the hierarchical structure of mask pattern data after layout expansion processing.
Figure 5:
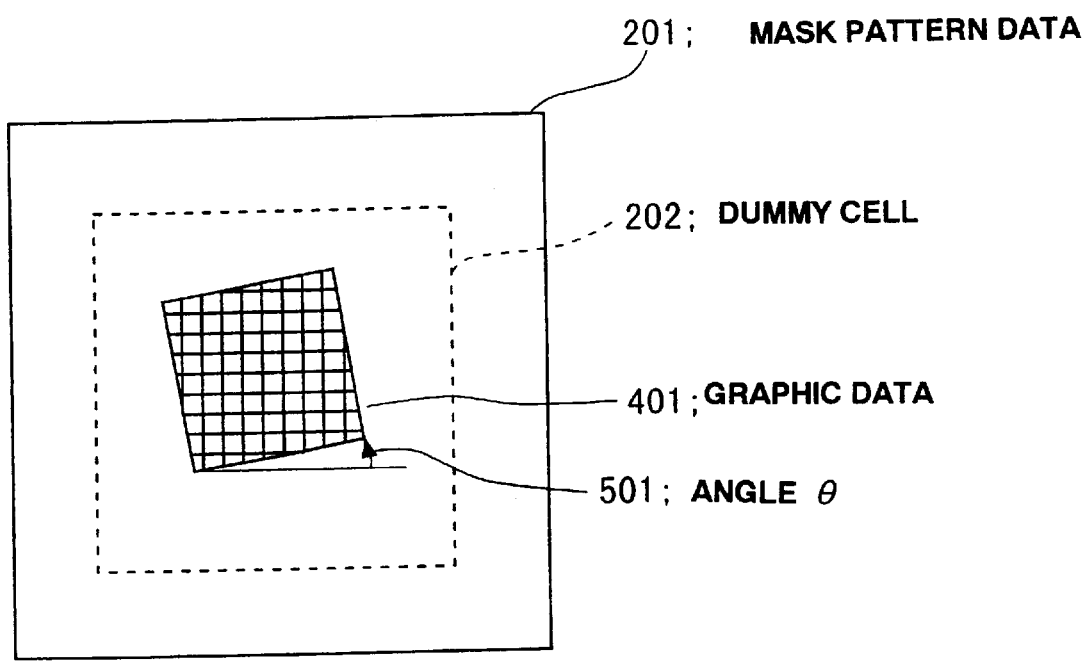
FIG. 5 is a diagram showing an embodiment of the present invention and explains the hierarchical structure of mask pattern data after layout expansion processing.

FIG. 4 shows the hierarchical structure of mask pattern data after the layout expansion processing 106, and FIG. 5 shows the mask pattern data.

Layout expansion processing 106 is executed to expand the layout cell data 203 into graphic data having an angle of θ (Angle in Table 1, 501), which is stored as layout data 401 in memory, as in the conventional art. Then, the dummy cell data 202 is placed hierarchically below mask pattern data 201. As a result, the lower level dummy cell data 202 may be viewed from the mask pattern data 201, and the additional data (attribute data) including the name and the location of the original layout cell data, layout data, rotation data, etc., is added to the dummy cell data 202 in which the graphic data generated by expanding and rotating the layout cell data is placed.

Next, when the dummy cell data 202 has been corrected ("no" as a result of correction judgment processing 101), layout data acquisition processing 107 is executed to get the layout data that has been added to the dummy cell data 202 as additional data, into memory for storage (see Table 1).

Next, deletion processing 108 is executed to delete the dummy cell data 202 from the mask pattern data 201. Then, the layout expansion processing 106 is executed by getting the new (that is, corrected) layout cell data 203 from the name (CellName in Table 1) of the layout cell data 203 and the directory path (DirPath in Table 1) corresponding to the location of the layout cell data which are stored as the layout data. This allows mask pattern data to be created without being subject to the stream data format limitation.

The first embodiment of the present invention expands all layout cell data with an angle of θ, resulting in a large amount of mask pattern data. However, a second embodiment of the present invention, explained below, prevents the amount of mask pattern data from increasing.

Figure 6:
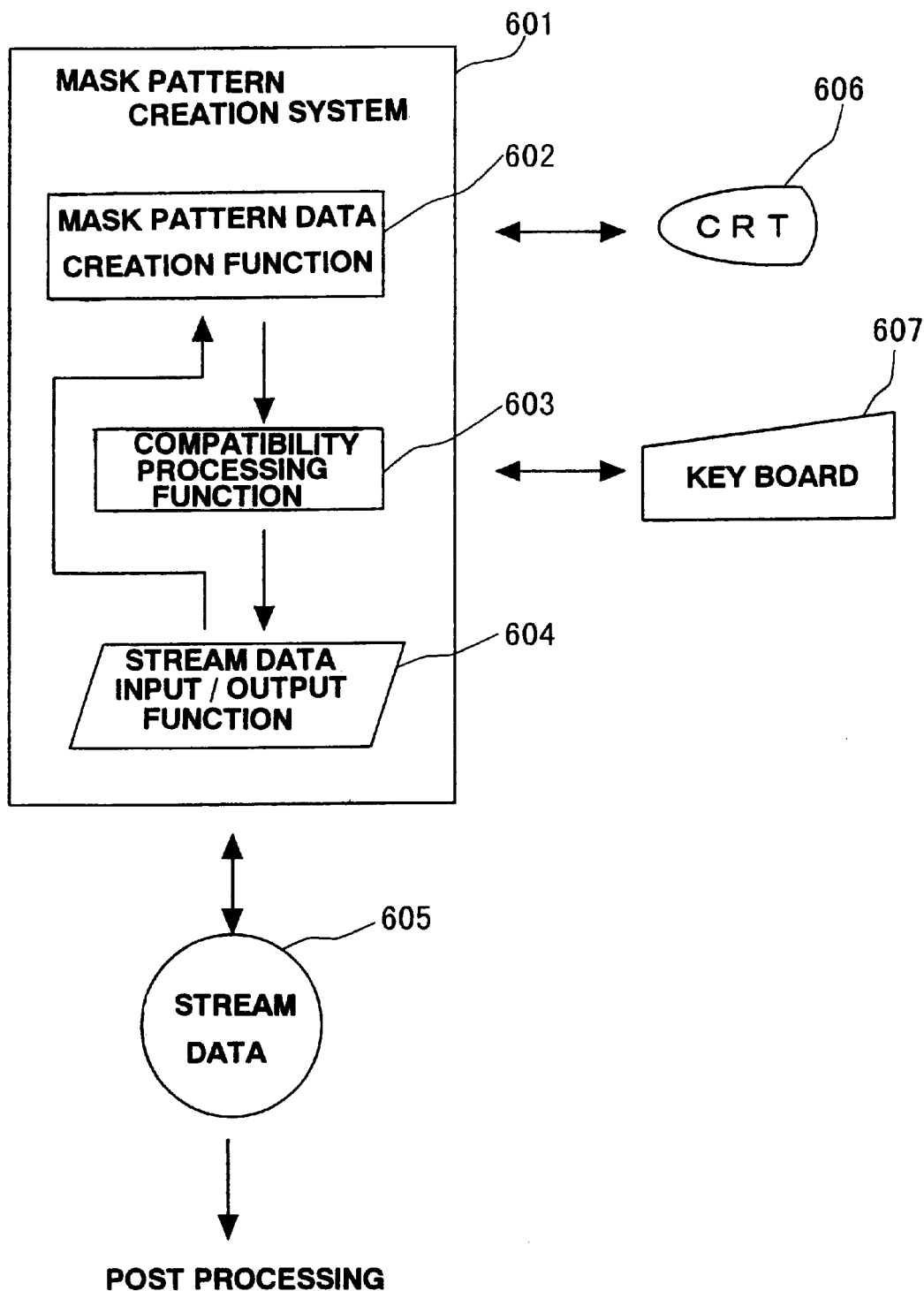
FIG. 6 is a block diagram of a mask pattern data creation system of a second embodiment of the present invention.
Figure 7:
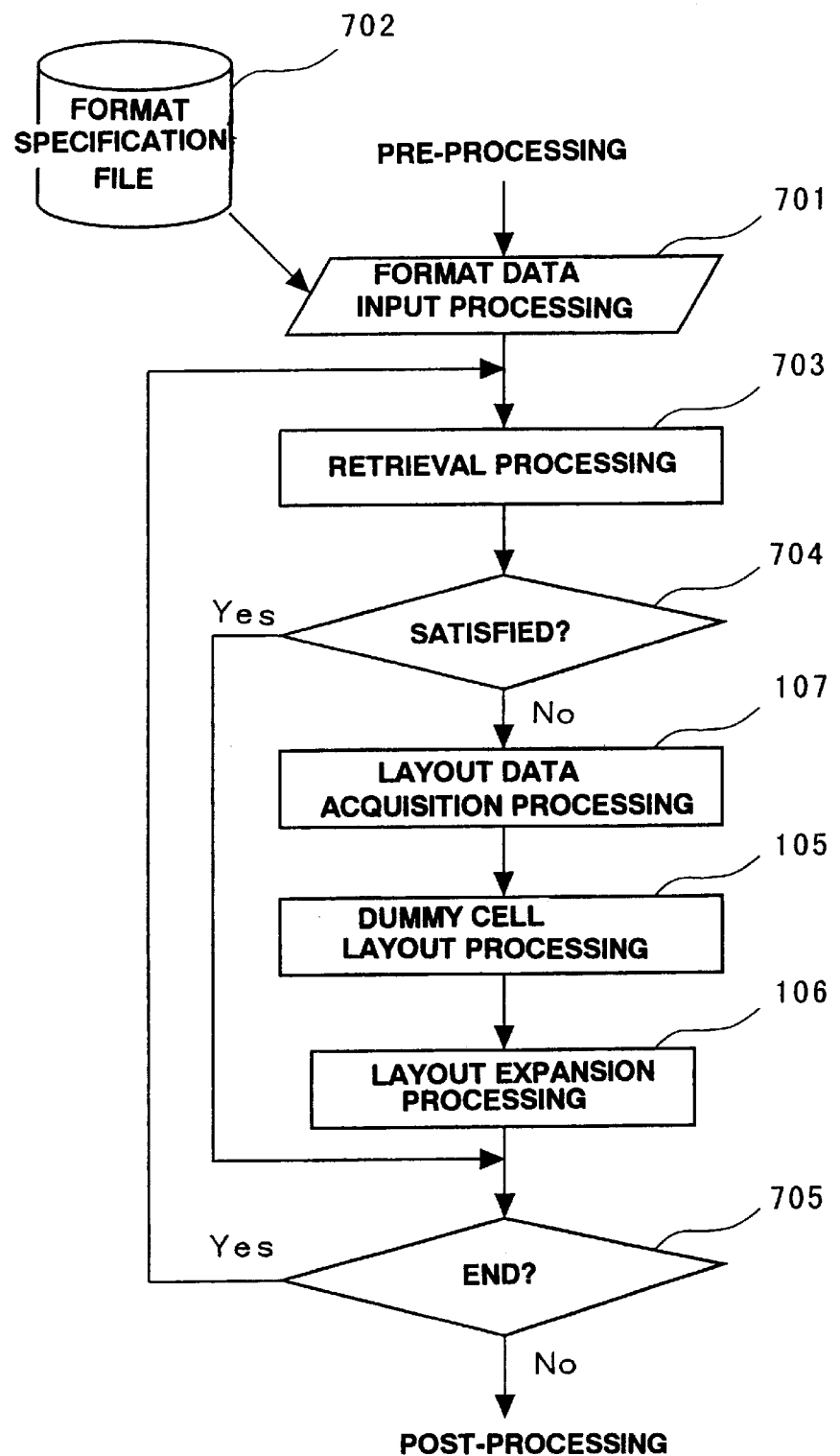
FIG. 7 is a diagram showing the processing flow of a compatibility processing function of the second embodiment of the present invention.

FIG. 6 is a block diagram showing the configuration of a mask pattern data creation system used in the second embodiment of the present invention. FIG. 7 is a diagram showing a process flow explaining a compatibility proceeding function used in the second embodiment of the present invention. Table 2, shown below, lists an example of format limitations stored in memory.

Figure 8:
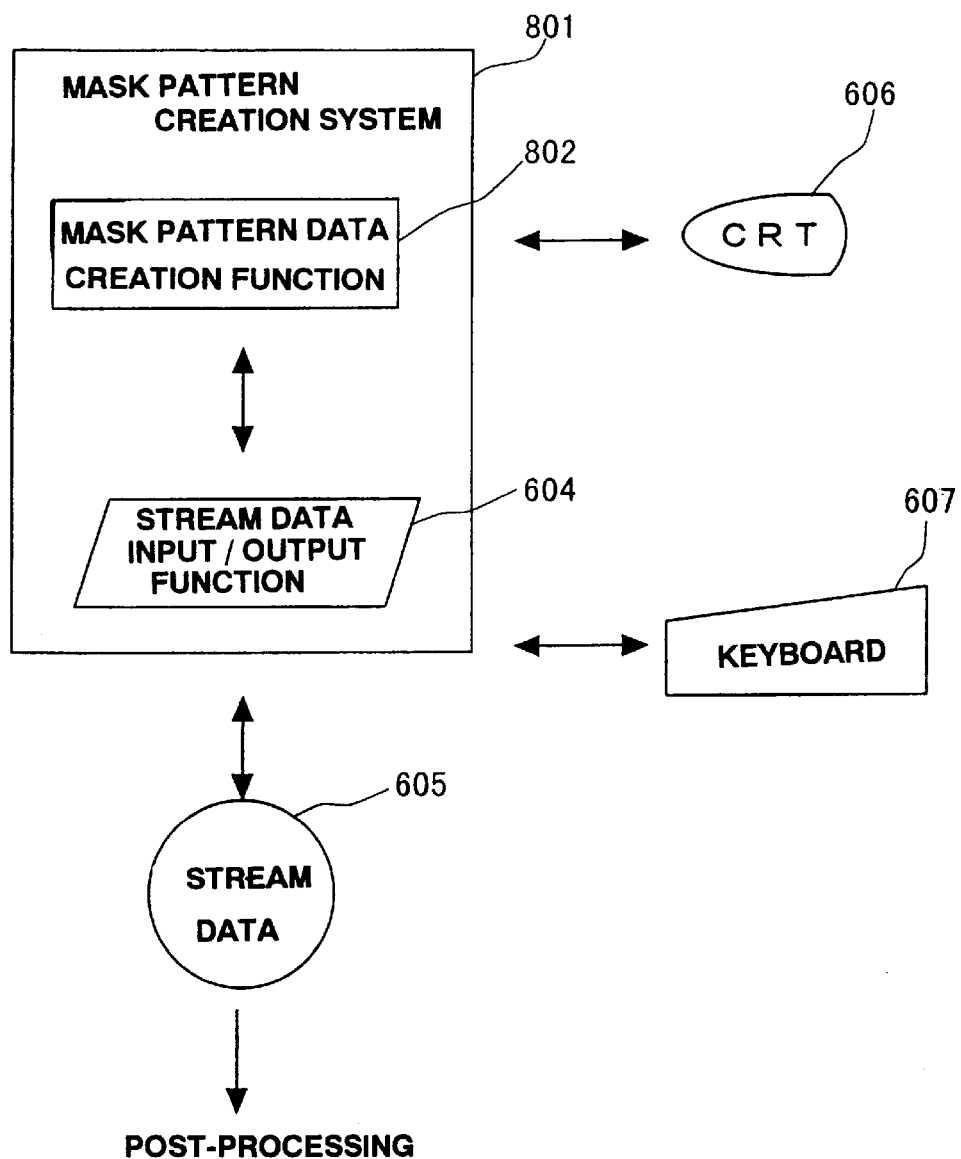
FIG. 8 is a block diagram showing the configuration of a conventional mask pattern data creation system.
Figure 9:
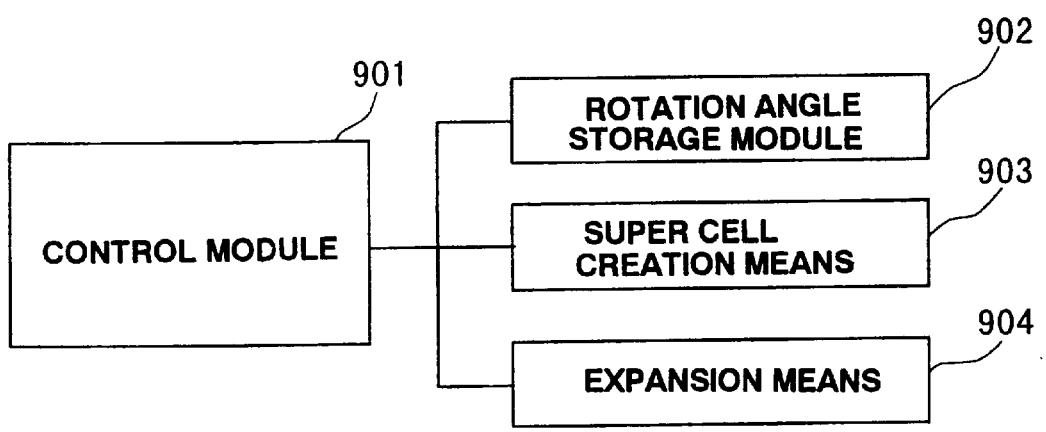
FIG. 9 is a block diagram showing the functional configuration of the mask pattern data creation function into which the function of a data processing system according to a prior art has been implemented.
Figure 10:
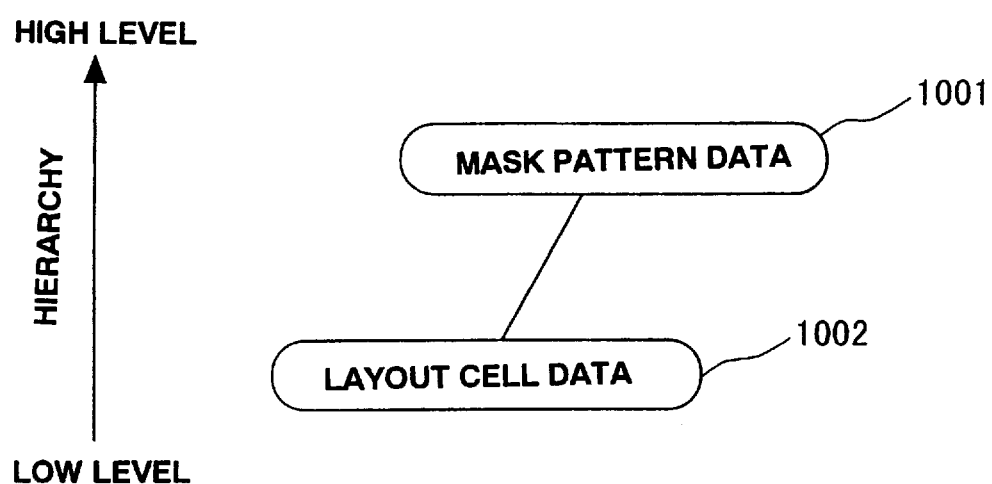
FIG. 10 is a diagram schematically showing the hierarchical structure of conventional mask pattern data.
Figure 11:
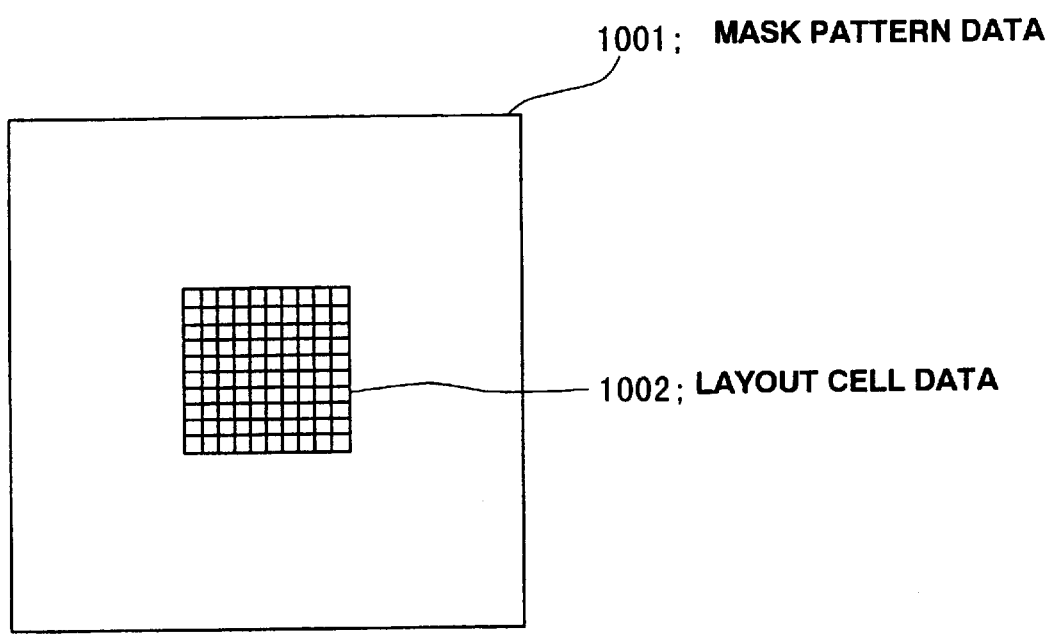
FIG. 11 is a diagram schematically showing the conventional mask pattern data.
Figure 12:
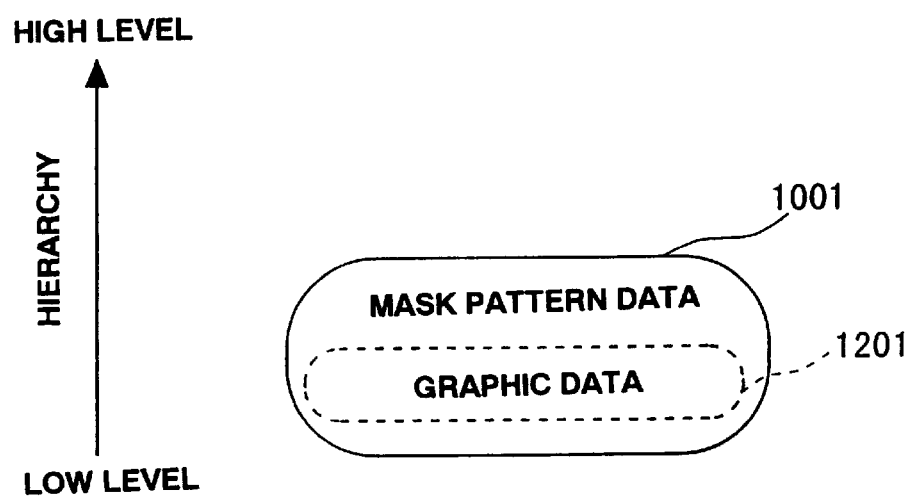
FIG. 12 is a diagram showing a conventional method and schematically explains the hierarchical structure of graphic data.
Figure 13:
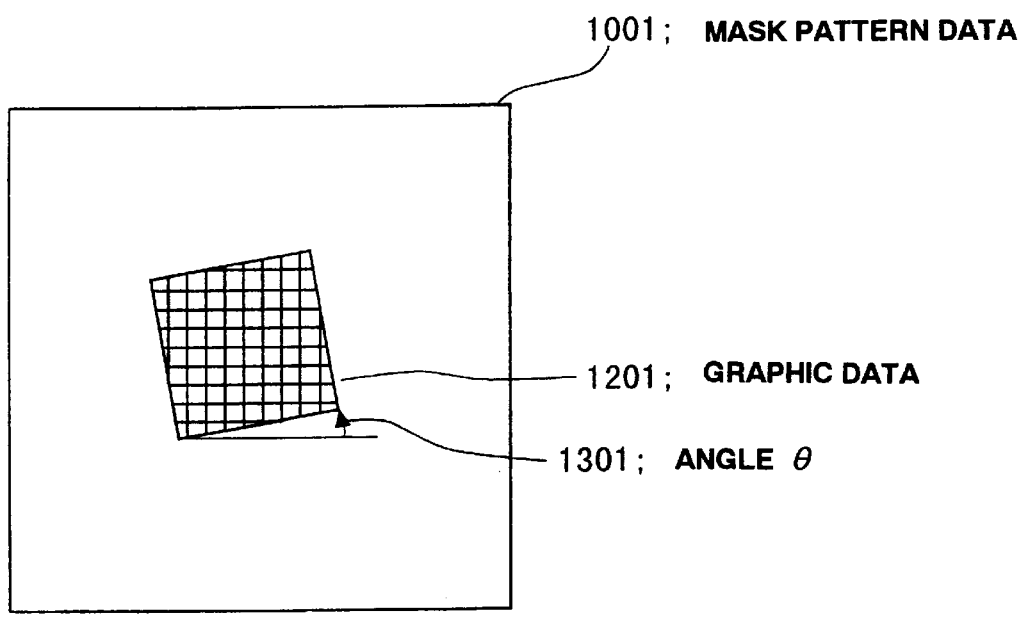
FIG. 13 is a diagram showing the conventional method and schematically explains the graphic data.

A mask pattern creation function 602 used in the second embodiment of the present invention shown in FIG. 6 is similar to the mask pattern data creation function 802 (see FIG. 8) shown in FIGS. 8 and 9 except that expansion means 904 (see FIG. 9) is replaced by the data addition processing 104 explained in the first embodiment of the present invention.

A compatibility processing function 603 used in the second embodiment of the present invention is explained below. As shown in FIG. 7, format data input processing 701 is executed to read from a format specification file 702 a format limitation specifying that the layout angle of layout cell data contained in stream data 605 must be in 90-degree increments and then the limitation data is stored in memory (Angle in Table 2).

TABLE 2

| Format | Value |
| --- | --- |
| Angle | 90 |

Next, all layout cell data placed hierarchically below the mask pattern data is retrieved (processing 703 to processing 705) and, for the retrieved layout cell data, a check is made to see if the limitation is satisfied (see Table 2). If this limitation is not satisfied ("no" as a result of judgment processing 704), a layout data acquisition processing 107, dummy cell data layout processing 105, and layout expansion processing 106 explained in the first embodiment are executed to create. mask pattern data not subject to the stream data format limitation.

In the embodiments described above, only a limitation on the stream data format angle is described. It should be noted that the present invention is not limited to the limitation on an angle but may be applied to other limitations to achieve the same effect. Thus, if applied to the mask pattern data creation of the layout of semiconductor integrated circuits, solid image sensing devices, liquid crystal systems, electronic circuits, and so forth, the present invention explained above using the embodiments greatly increases work efficiency and reliability.

As described above, when correcting the layout cell data hierarchically lower than mask pattern data as for the mask pattern data having the hierarchy structure, the present invention automatically reflects changes introduced into the layout cell data and eliminates the need for a user to manually delete or lay out the layout cell data in order to prevent human errors that may be introduced into the layout data on the layout cell data to be laid out in mask pattern data. Therefore, the present invention ensures increased work efficiency, reliability, and productivity.

Following explanations are directed to the figures:
101 correction judgement processing
606 display
704 judgement processing of retrieval result
705 judgement proceeding of end Further explanations on the reference numerals will be directly available from the figures.

It should be noted that modifications apparent in the art may be done without departing the gist and concept as disclosed herein within the scope as claimed herein.

What is claimed is:

1. A mask pattern data creating method comprising the steps of:
   entering layout data;
   placing dummy cell data hierarchically below mask pattern data;
   placing layout cell data hierarchically below said dummy cell data based on the entered layout data of the layout cell data;

adding graphic data of said layout cell data to said dummy cell data;

adding the layout data of said layout cell data to said dummy cell data as additional data, said additional data comprising data other than graphic data of said layout cell data hierarchically below said dummy cell data; and creating graphic data rotated through an angle specified in the layout data by expanding said layout cell data placed hierarchically below said dummy cell data.

2. A mask pattern data creation system comprising:

layout data input means for reading layout data of layout cell data;

dummy cell layout means for placing the layout cell data hierarchically below dummy cell data based on said layout data, for placing said dummy cell data hierarchically below mask pattern data, for adding graphic data of said layout cell data to said dummy cell data, and for adding the layout data of said layout cell data to said dummy cell data as additional data, said additional data comprising data other than graphic data of said layout cell data hierarchically below said dummy cell data; and layout expansion means for creating graphic data corresponding to an angle specified in the layout data by expanding the layout cell data placed hierarchically below said dummy cell data.

3. The mask pattern data creation system as defined in claim 2, further comprising:

layout data acquisition means for reading the layout data from said dummy cell data when the layout cell data is corrected; and deletion means for deleting said graphic data from said dummy cell data.

4. The mask pattern data creation system as defined in claim 2, further comprising:

layout data acquisition means for acquiring the layout data of the layout cell data not satisfying a format limitation upon outputting the mask pattern data.

5. A computer-readable medium having stored therein a mask pattern creation program which creates mask pattern data using a data processing system, said program comprising:

(a) a layout data input process which reads layout data of layout cell data;

(b) a dummy cell layout process which places the layout cell data hierarchically below dummy cell data based on said layout data and places said dummy cell data hierarchically below mask pattern data, and which adds graphic data of said layout cell data to said dummy cell data, and which adds the layout data of said layout cell data to said dummy cell data as additional data, said additional data comprising data other than graphic data of said layout cell data hierarchically below said dummy cell data; and (c) a layout expansion process which creates graphic data corresponding to an angle $\theta$ specified in the layout data by expanding the layout cell data placed hierarchically below said dummy cell data.

6. The computer-readable medium as defined in claim 5, said medium having stored therein the mask pattern data creation program which further comprises:

(d) a layout data acquisition process which reads the layout data added to said dummy cell data when the layout cell data is corrected; and (e) a deletion process which deletes the graphic data from said dummy cell data.

7. The computer-readable medium as defined in claim 5, said medium having stored therein the mask pattern data creation program which creates the mask pattern data using the data processing system and which further comprises:

(f) a layout data acquisition process which acquires the layout data of the layout cell data not satisfying a format limitation upon outputting the mask pattern data.

* * * * *